US006421732B1

(12) United States Patent
Alkhatib et al.

(10) Patent No.: US 6,421,732 B1
(45) Date of Patent: Jul. 16, 2002

(54) IPNET GATEWAY

(75) Inventors: Hasan S. Alkhatib, Saratoga; Bruce C. Wootton, Palo Alto, both of CA (US)

(73) Assignee: IP Dynamics, Inc., Santa Clara, CA (US)

( * ) Notice: Subject to any disclaimer, the term of this patent is extended or adjusted under 35 U.S.C. 154(b) by 0 days.

(21) Appl. No.: 09/167,709

(22) Filed: Oct. 6, 1998

Related U.S. Application Data

(60) Provisional application No. 60/098,205, filed on Aug. 27, 1998.

(51) Int. Cl.[7] .............................................. G06F 13/00
(52) U.S. Cl. ....................................... 709/245; 709/227
(58) Field of Search ................................. 709/245, 227

(56) References Cited

U.S. PATENT DOCUMENTS

| | | | |
|---|---|---|---|
| 5,361,256 A | 11/1994 | Doeringer et al. | 370/390 |
| 5,623,605 A | 4/1997 | Keshav et al. | 709/236 |
| 5,717,687 A | 2/1998 | Minot et al. | 370/257 |
| 5,751,961 A | 5/1998 | Smyk | 709/217 |
| 5,777,989 A | 7/1998 | McGarvey | 370/254 |
| 5,781,550 A | 7/1998 | Templin et al. | 370/401 |
| 5,790,548 A | 8/1998 | Sistanizadeh et al. | 370/401 |
| 5,805,818 A | 9/1998 | Perlman et al. | 709/224 |
| 5,805,820 A | 9/1998 | Bellovin et al. | 709/225 |
| 5,856,974 A | 1/1999 | Gervais et al. | 370/392 |
| 5,867,667 A | 2/1999 | Butman et al. | 709/249 |
| 5,884,038 A * | 3/1999 | Kapoor | 709/226 |
| 5,884,246 A | 3/1999 | Boucher et al. | 704/2 |
| 5,889,953 A | 3/1999 | Thebaut et al. | 709/221 |
| 5,913,210 A | 6/1999 | Call | 707/4 |
| 5,937,162 A | 8/1999 | Funk et al. | 709/206 |
| 5,937,163 A | 8/1999 | Lee et al. | 709/218 |
| 6,003,084 A | 12/1999 | Green et al. | 709/227 |
| 6,119,171 A * | 9/2000 | Alkhatib | 709/245 |
| 6,122,276 A * | 9/2000 | Boe et al. | 370/389 |
| 6,219,715 B1 * | 4/2001 | Ohno et al. | 709/245 |
| 6,243,749 B1 * | 6/2001 | Sitaraman et al. | 709/223 |

OTHER PUBLICATIONS

RFC 1541; Dynamic Host Configuration Protocol; R. Droms; pp. 1–34; Oct. 1993.*
Excerpts from the Help section of Microsoft Outlook pertaining to rules and forwarding email. Microsoft Corporation.
Computer Networks, Third Edition, by Andrew S. Tanenbaum, 1996, pp. 643–670, 685–691.
Inside Apple Talk®, Second Edition, by G. Sidhu, R. Andrews, A. Oppenheimer, 1990.
RFC 1631, The IP Network Address Translator (NAT), K. Egevang and P. Francis, May 1994.

* cited by examiner

*Primary Examiner*—Kenneth R. Coulter
(74) *Attorney, Agent, or Firm*—Vierra Magen Marcus Harmon & DeNiro LLP

(57) ABSTRACT

The IPNet Gateway (IPNGw) is a new technology that maps multiple servers on a private IP network to a single IP address on the Internet. As requests come in for DNS resolution of the server's domain name, the IPNet Gateway records the domain of the requesting client and the name of the requested server, and returns its own address as the destination address for the requested domain name. This DNS response is set as non-cacheable to prevent the association between the IPNGw IP address and the domain name of the target server beyond the anticipated following transaction from the client. As soon as the IPNGw responds to the DNS request it enters into a waiting state anticipating a connection from the client to the specific server identified in the DNS request. Subsequently, the client establishes a connection with the IPNGw, which in turn relays the connection request to the server.

38 Claims, 4 Drawing Sheets

State Diagram for IPNet Gateway Connection Establishment

IPNet Gateway Based on Client/Server Network

IPNet Gateway Timing Diagram
Client Using a Recursive DNS Server

State Diagram for IPNet Gateway Connection Establishment

IPNET GATEWAY

This Application claims the benefit of U.S. Provisional Application No. 60/098,205, IPNet Gateway, by Hasan Alkhatib and Bruce Wootton, filed on Aug. 27, 1998.

BACKGROUND OF THE INVENTION

1. Field of the Invention

The present invention is directed to a system for allowing the mapping of multiple entities on a network to a single address.

2. Description of the Related Art

Most machines on the Internet use TCP/IP (Transmission Control Protocol/Internet Protocol) to send data to other machines on the Internet. To transmit data from a source to a destination, the Internet protocol (IP) uses an IP address. The Internet protocol has been in use for over two decades and has worked well, as demonstrated by the exponential growth of the Internet. Unfortunately, the Internet is rapidly becoming a victim of its own popularity. It is running out of addresses. Therefore, a system is needed that can effectively alleviate the diminishing IP addresses problem.

SUMMARY OF THE INVENTION

The IPNet Gateway (IPNGw) is a new technology that maps multiple servers on a private IP network to a single IP address on the Internet. The servers are referenced uniquely using their Internet domain names. The IPNet Gateway offers a solution to the Internet IP address shortage problem. It is also being considered as the basis for a secure firewall design.

As requests come in for DNS resolution of the server's domain name, the IPNet Gateway records the domain of the requesting client and the name of the requested server, and returns its own address as the destination address for the requested domain name. This DNS response is set as non-cacheable to prevent the association between the IPNGw IP address and the domain name of the target server beyond the anticipated following transaction from the client. As soon as the IPNGw responds to the DNS request it enters into a waiting state anticipating a connection from the client to the specific server identified in the DNS request. Subsequently, the client establishes a connection with the IPNGw, which in turn relays the connection request to the server.

These and other objects and advantages of the invention will appear more clearly from the following detailed description in which the preferred embodiment of the invention has been set forth in conjunction with the drawings.

DETAILED DESCRIPTION

Figure 1:
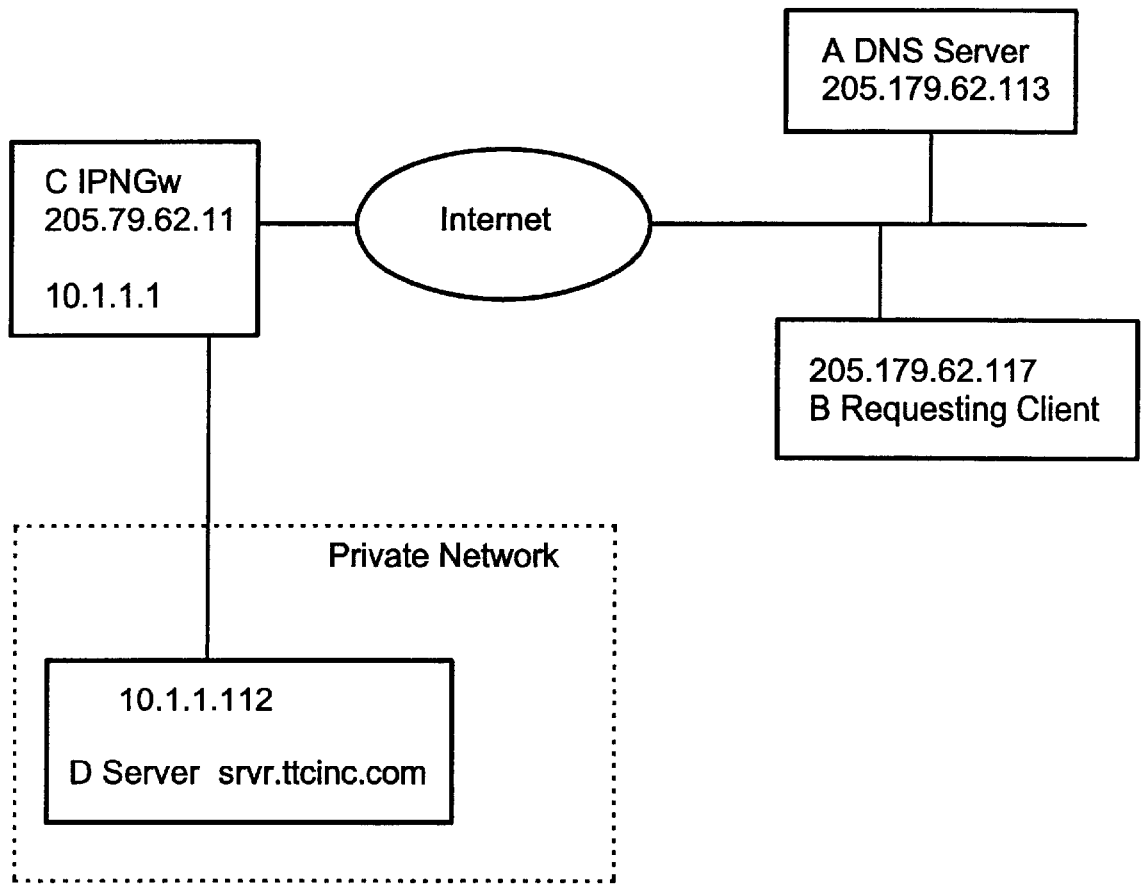
FIG. 1 is a block diagram which depicts an IPNet Gateway and various other entities.

For a server to become visible on the Internet it has to have a unique domain name. It does not need a globally unique IP address. Instead, it is assigned a local IP address. To allow access to such a server in a private IP network by clients on the Internet, a client application has to reference the server by its domain name. Since the server does not have a globally unique IP address corresponding to its domain name, no DNS server on the Internet will have an entry for this server's domain name. The IPNGw is designated as the DNS authority for such servers in its private IP network. As a result, the server's IPNGw will intercept every DNS resolution request for the server domain name.

As requests come in for DNS resolution of the server's domain name, the IPNGw records the domain of the requesting client and the name of the requested server, and returns its own address as the destination address for the requested domain name. This DNS response is set as non-cacheable to prevent the association between the IPNGw IP address and the domain name of the target server beyond the anticipated following transaction from the client. As soon as the IPNGw responds to the DNS request it enters into a waiting state anticipating a connection from the client to the specific server identified in the DNS request. Subsequently, the client establishes a connection with the IPNGw, which in turn relays the connection request to the server.

If the connection made by the client is a TCP connection, it is established, maintained and tracked by the IPNGw until it is disconnected. During a TCP connection, the IPNGw acts as a packet relay on behalf of the client in the Internet and the server in the private IP network.

If the packet received from the client is not for a TCP connection, such as the case with UDP and ICMP packets, the packet is relayed to the server and the IPNGw exits the waiting state. This action forces the client to make a DNS request with every packet that it needs to deliver to the server in the private IP network.

Some applications cache the IP address obtained after a DNS request and reuse it with multiple TCP connections to the same server. In general, the IPNGw will fail to relay packets of the new connection to the server. This forces the application to request a new DNS resolution for the domain name of the target server in the private IP network. Each application that caches IP addresses and reuses them with subsequent TCP connections will require special treatment and the employment of an application specific proxy in the IPNet Gateway.

Of particular interest from applications that cache IP addresses after DNS requests are web browsers. Since web browsers employ HTTP, and since HTTP includes the domain name string of its destination node, the IPNGw extracts the domain name of the destination server from the HTTP header received with every HTTP packet. Therefore, HTTP packets can be relayed from the client to the server directly, even if the client caches the IP address received from the IPNGw after DNS resolution requests. A special proxy server is required for the FTP application.

FIG. 1 is a block diagram that can be used to illustrate the operation protocols designed for the IPNet Gateway. For example purposes, assume Host A at 205.179.62.113 is the DNS server for the client subnet, and Host B at 205.179.62.117 is the requesting client. Also, Host C at 205.79.62.11 is the IPNGw and Host D at 10.1.1.112 is the server using a private IP address in the private network and a global domain name 'srvr.ttcinc.com'.

The following set of events will occur if A is a non-recursive DNS server:

(1) B requests srvr.ttcinc.com (i.e. D's) IP address from A.

(2) A refers B to C as the designated DNS authority for srvr.ttcinc.com.

(3) B requests D's address from C.

(4) C records B's IP address and domain as well as D's domain name (srvr.ttcinc.com) as the destination. C returns its own address as the destination address to D. C enters into a waiting state for a connection request from B. During this period C will block from accepting any new DNS requests from B's domain and IP network.

(5) B sends C a request to establish a connection.

(6) C accepts B's connection, and checks if B is the same node that requested the DNS resolution to srvr.ttcinc.com (i.e. D). Since this is the case in this example, then C associates the request with the server D. It removes the record from the IPNGw's table to allow new connection requests from B's domain and IP network.

(7) C forwards the requests for the connection from B on to D and returns responses from D back to B acting as a packet relay.

(8) B finishes session with D, shuts down connection with C. C shuts down connection with D.

If A is a recursive DNS server, the following sequence of events is expected:

(1) B requests srvr.ttcinc.com (i.e. D's) IP address from A.

(2) A requests D's address from C.

(3) C records B's IP address and domain as well as D's domain name (srvr.ttcinc.com) as the destination. C returns its own address as the destination address to D. C enters into a waiting state for a connection request from B. During this period C will block from accepting any new DNS requests from B's domain and IP network.

(4) A returns C's IP address as the address for srvr.ttcinc.com to B.

(5) B sends C a request to establish a connection.

(6) C accepts B's connection, and finds B's domain. It finds that B's domain is the same as A's and thus associates the request with the server D. It removes the record from the IPNGw's table to allow new connection requests from B's domain and IP network.

(7) C forwards the requests for the connection from B on to D and returns responses from D back to B acting as a packet relay.

(8) B finishes session with D, shuts down connection with C. C shuts down connection with D.

The IPNGw uses DNS requests to match client connection requests to private IP network servers. A client may make a DNS request directly or through a recursive DNS server. It is assumed that the client makes recursive DNS requests from a DNS server that has the same authority listings as the client. It can be checked to see that clients and DNS servers are in the same domain using two different tests: IP Network Matching and DNS Authority Matching.

In IP Network Matching, the IP addresses of the two hosts are masked based on the network class. Class A IP addresses are masked with 255.00.00.00, class B IP addresses are masked with 255.255.0.0 and class C addresses are masked with 255.255.255.0. If the masked addresses are equal, there is a match.

In DNS Authority Matching, the DNS authorities are found for the hosts with the two IP addresses. This requires two steps. First, each hosts IP address is resolved to a domain name via the "Pointer" DNS request. Second, the authorities of the two hostnames are found using the "A" DNS request which returns both the IP address and the authorities for a given set of hosts. If the two hosts have overlapping authority records, there is a match.

Using the above two tests, a method can be used to decide where or if we should route a connection. To keep track of the state of the potential connections, there are a number of tables. The DNSTable keeps track of pending DNS requests. The PendingTable keeps track of pending connections. There is also a StaticAddressTable which tells which hidden server addresses are attached to which domain names.

```
typedef struct sdNSTableEntry
{
    int valid;
    struct in_addr requestingAddress;/*A's addr in our
        example */
    struct in_addr forwardingAddress;/*D's addr in our
        example */
    short ttl;
} sDNSTableEntry;
typedef struct spendingTableEntry
{
    struct in_addr requestingAddress;/*B's addr in our
        example */
    u_short requestedPort;
    int sdRequestingSocket;
    short ttl;
    unsigned short usMessageID;
    int valid;
} sPendingTableEntry;
```

The basic method, which is a loop that waits for connections and DNS requests, is described by the pseudo-code below.

```
Initialize tables;
While (true)
{
    Listen for data on all sockets;
    if (data is a DNS request)
    {
        find the local address of the requested server;
        if (requested server cannot be found locally) send
            back "Host does not exist" DNS response;
        else
        {
            if (DNS table has another pending request from same
                network) drop DNS request;
            else
            {
                add local address of requested server to DNS table;
                add global address of requesting server to DNS table;
                send back IPNGw address in the DNS response;
            }
        }
    }
    else if (data is a new connection request)
    {
        add connection information to connection pending
            table;
        send out DNS request to find out the DNS authority for
            the connecting host;
    }
    else if (data is a DNS response)
    {
        find the pending connection request that generated the
            DNS response;
        find the entry in the DNS request table that has the same
            requesting address of the returned authority or the
            same requesting address as the host generating the
            connection request;
``` remove the DNS request table entry;
remove the pending connection table entry;
complete the connection to the local hidden server found in the DNS request table.
}
else if (data is on current connection) forward data along the connection
}
Note that time-outs are included in each table entry so that old requests are dropped from consideration after a reasonable wait.

IPNGw routing decisions are based on matches with entries in the two state tables listed above. The IPNGw uses both IP Network Matching and DNS Authority Matching at different times during the method. The timing diagram of FIG. 2 outlines the relevant connections and decisions made while routing a connection. In step 1, a DNS request is made to the IPNGw. The IPNGw uses IPNetwork Matching to determine if another server from the same network is already in the DNSTable. If so, discard the DNS request. Otherwise, proceed to step 2. In step 2, the IPNGw responds to the DNS request with its own IP address. In step 2A, a TCP Connect request is made. The IPNGw will determine if an entry in the DNSTable is from the same network. If so, proceed to step 3; otherwise, proceed to step 4. In step 3, a TCP connection is established. In step 4, the IPNGw will perform a DNS Pointer lookup and receive an appropriate response. In step 5, the IPNGw will perform a DNS request and receive an appropriate response. The IPNGw will use DNS Authority Matching to determine if an entry in the DNSTable has the same Authorities as the return list A. If not, drop the connection and go to step 1; if so, continue to step 3.

Figure 2:
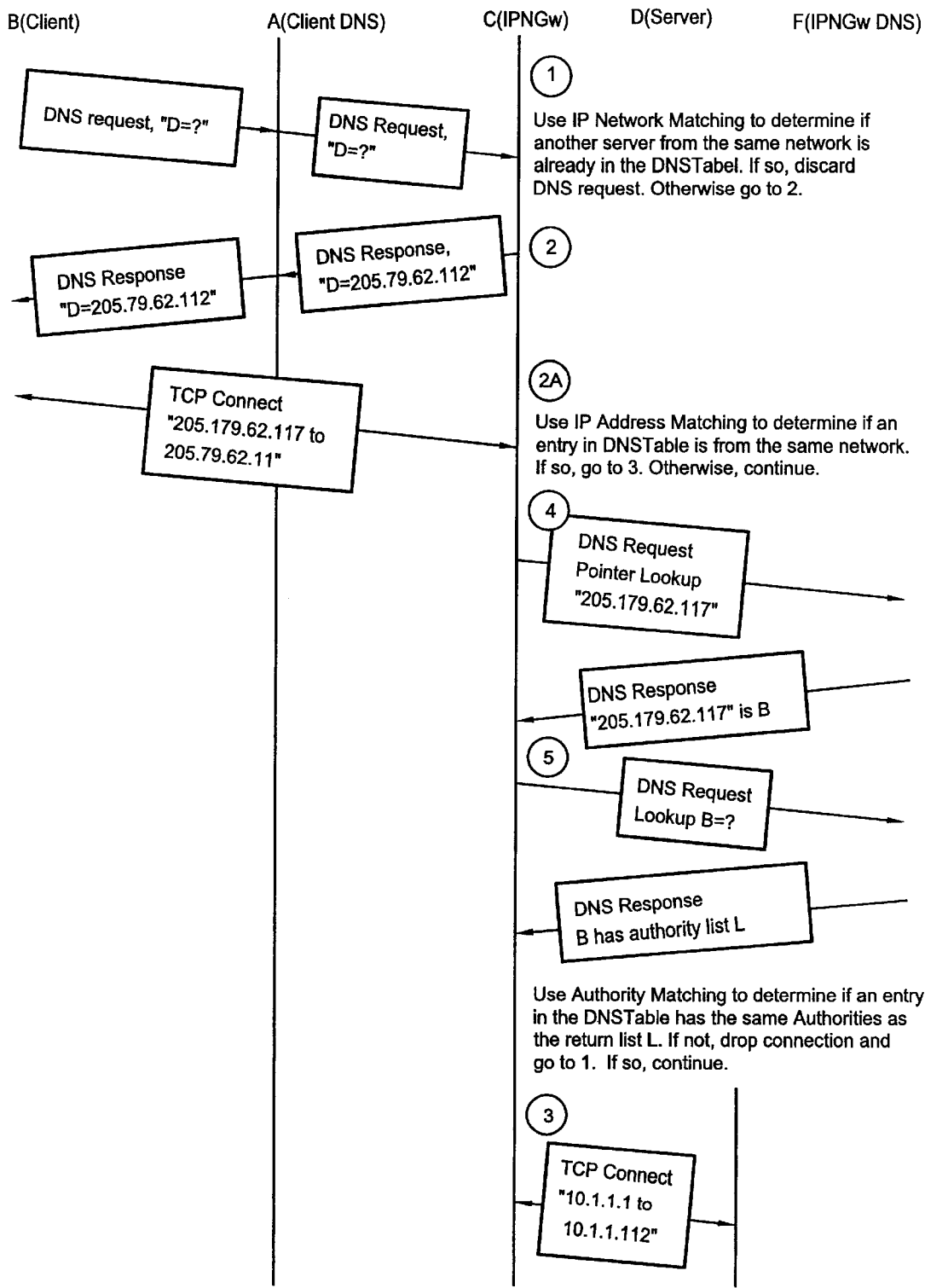
FIG. 2 is a timing diagram which describes the operation of the IPNet Gateway.

The timing diagram of FIG. 2 shows that there are two phases when new connection requests will be denied. First, when a DNS request has been made from the same domain and no connection has been established and second, when a connection has been established and an authority lookup is taking place on the connection. Experience shows that the first phase is a very small time period (<1 second) and the second phase is somewhat longer (2–6 sec). Connection requests from other processes or servers in the domain are deferred until the first connection is established or times out.

Figure 3:
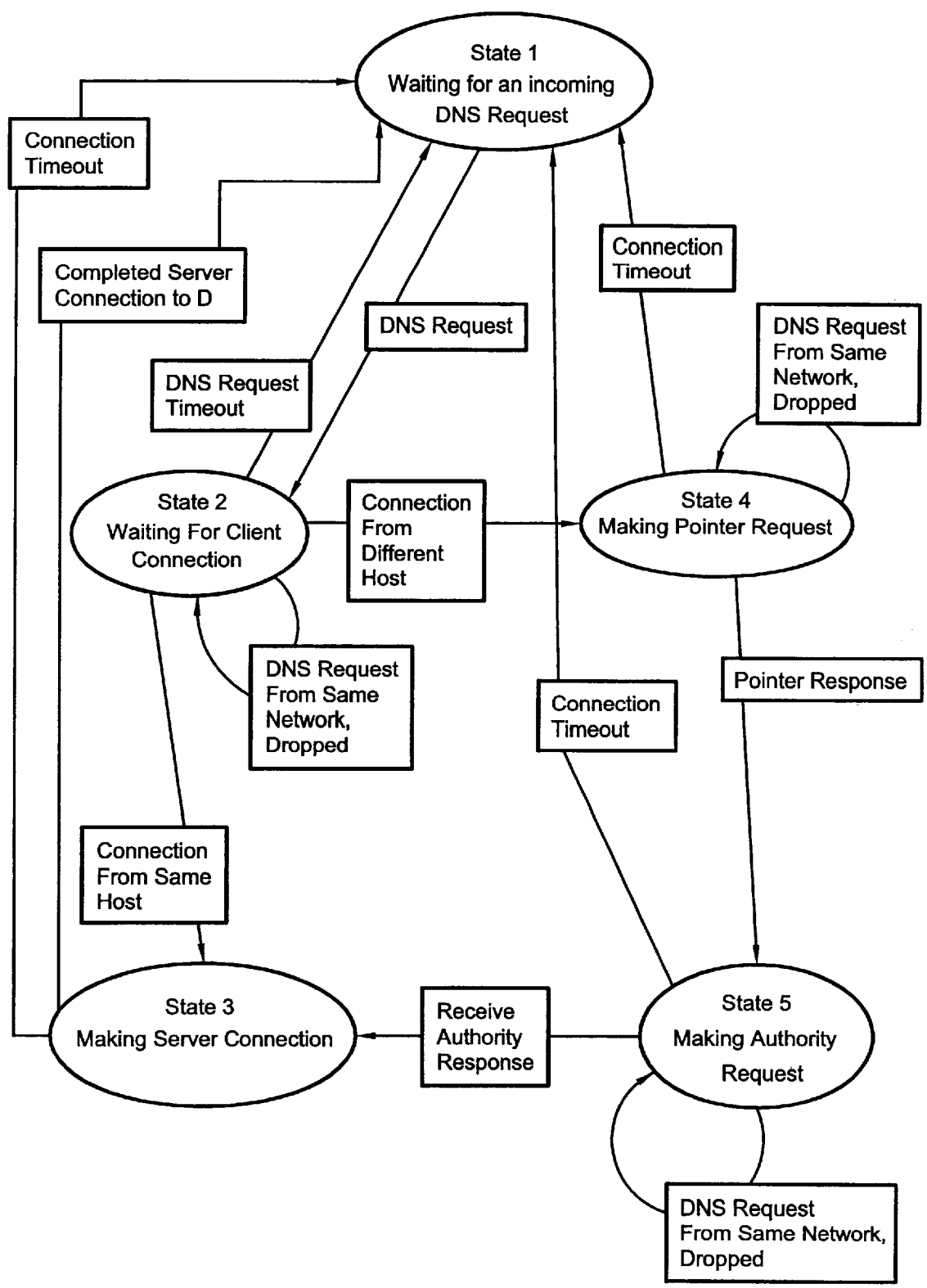
FIG. 3 is a state diagram for the IPNet Gateway.

FIG. 3 is a state diagram formalizing the functional behavior of the IPNet Gateway for establishing connections to servers in a private network from clients on the Internet. State 1 includes waiting for an incoming DNS request. State 2 includes waiting for a client connection. State 3 includes making a server connection. State 4 includes making a pointer request. State 5 includes making an authority request.

The IPNet Gateway should have a similar performance to other NAT gateways. Fundamentally, similar operations must be performed: a lookup in the routing table of the IPNet Gateway followed by a write to the packet header and a checksum calculation. However, there is also a performance penalty at time of initial connection as established above. Basically, each connection must be preceded by 3 DNS lookups. Although average lookup time is less than a second within geographical areas, it may well run multiple seconds across continents. Considering that only one connection request can be entertained at once, and average time of cross continental lookups is 4 seconds. There is a functional limit of connections/day from a single domain of 3 dns lookups*4 seconds=12 seconds/connection (5 connections/minute)

5 connections/minute*60 minutes/hour*24 hours/day= our minimum connection rate from a given domain is 7200 connects/day There are a number of general limitations on the IPNGw system. Only one connection request can be accepted from a given domain at a time. Because the original DNS request may have come from a DNS server instead of the requesting computer, there cannot be more than one DNS request entertained from the same domain. Otherwise, the requesting client will be ambiguous and a connection may be routed to the wrong server. This constraint lasts until the connection is established. At this point, the original request will be removed from the list of pending connections and new requests from the domain will be entertained. Experimentation has shown that the time for connection establishment is approximately 4 seconds (dependent on distance and traffic). In general, locked out requests will be dropped instead of being explicitly denied so that the locked out client will have another chance to connect when their DNS retries. In this case, the only noticeable change in service would be a momentary slowness during DNS resolution. However, if many clients are trying to establish connections from the same domain at the same time, it is possible that some of these clients will time-out before a connection slot becomes available.

It is important to note that the total number of simultaneous connections is not constrained: only the total number of simultaneous new connections is constrained.

All connections from a client to a server must be preceded by a DNS request. If a client does not make a DNS request prior to each connection, the IPNGw will be unable to determine the true destination of the request. If the client software caches the IP address of the server for use with multiple connections, the IPNGw will generally be unable to service the connections. In some cases (notably HTTP) the data sent on the connection can be examined to determine its destination, but in other cases (particularly S-HTTP and most ICMP and UDP services) there is no way to determine the destination of all but the first packet.

The requesting client must have a valid global name in the Domain Name System. A client's destination is determined by associating it with a Domain. This is because a DNS server in the client's domain instead of the client may make the DNS request to the IPNGw. If the client's IP address is not reverse query-able, the domain that the client is in cannot be determined. In cases where the client originates the DNS request or the recursive DNS server is in the same IP network of the client, the IPNet Gateway is able to deal with the client without having to have its domain name.

A number of protocols were examined to determine which protocols can be used directly with IPNGw and which can be used in a specially devised proxy. The following table summarizes the findings. Those entries that have One Connection/DNS will work with the IPNGw unmodified. In general, the table has been compiled by observing the standard implementations of the clients listed. This means that some clients may conflict with the standard implementation.

| Application/Protocol | Method with which application is handled |
| --- | --- |
| HTTP | Use HTML Redirect Method |
| JAVA, HTML etc. | Travel over HTTP (see above) |
| Telnet | One Connection/DNS |
| FTP | One Connection From Client to Server/DNS . Multiple from Server to Client |
| SMTP | One Connection/DNS |

| Application/Protocol | Method with which application is handled |
| --- | --- |
| POP3 | One Connection/DNS |
| IMAP 4 | One Connection/DNS |
| Ping | One DNS, many packets |
| Trace-Route | One DNS, many packets |
| Real Audio/Video | can be set to receive through TCP or HTTP only (bypassing UDP) |
| X-Windows | One Connection/DNS |
| Use HTML Redirect Method | |

In most cases, the protocols listed use the standard One connection/DNS. Of those that don't, three are of interest.

Figure 4:
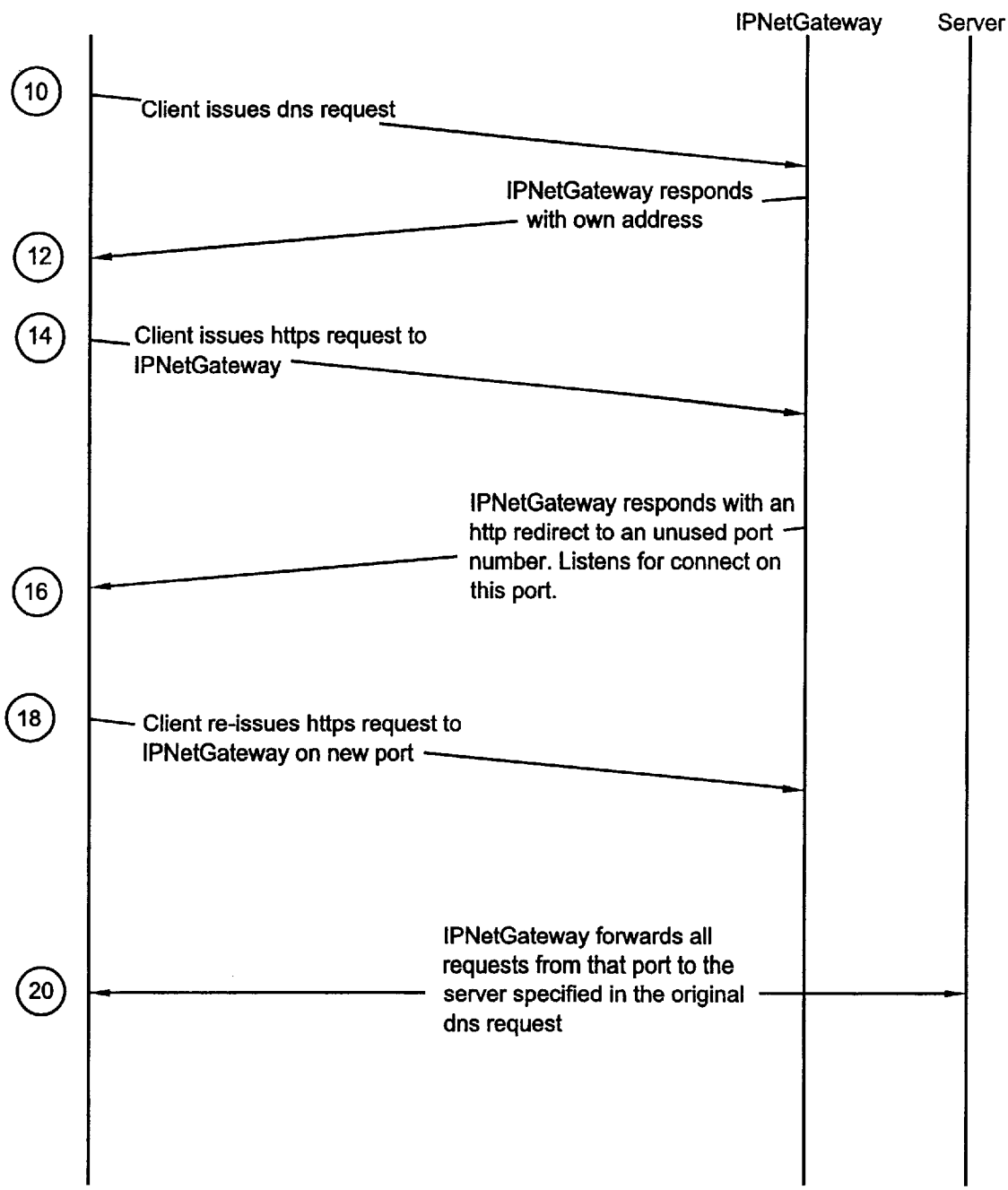
FIG. 4 illustrates the operation of the IPNet Gateway with the HTTP protocol.

Although the HTTP protocol does not use a one connection/DNS paradigm in its popular clients, routing can still be done on the HTTP requests by using HTML redirection. The basic idea in HTML redirection is that HTML requests at the known HTML port (usually port 80) can be re-directed to an arbitrary port at the time of receipt. The redirection can be driven using the normal IPNet Gateway approach: looking at the requested DNS entry. Subsequent requests to the same server from the same client will default to same (cached) port so new requests to the server from the same client can be tracked by the redirected port number. FIG. 4 illustrates the procedure. In step 10, a client issues a DNS request. In step 12, the IPNGw responds with its own address. In step 14, the client issues an HTTP request to the IPNGw. In step 16, the IPNGw responds with an HTTP redirect to an unused port number. The IPNGw listens for a connect on this port. In step 18, the client re-issues the HTTP request to the IPNGw on the new port. In step 20, the IPNGw forwards all requests from that port to the server specified in the original DNS request.

In general, the UDP and ICMP utilities (ping, traceroute, etc. . . . ) do not make a DNS request for each packet sent. Because UDP and ICMP are connection-less, specific packets cannot be assigned to specific established connections. It is possible to track connections on a case by case basis if some sort of destination or stream ID is located in the packet. A separate module would need to be made for each tracked packet.

FTP makes a single connection from the client to the server followed by multiple connections from the server to the client. In general, the servers are understood to be routed through classical Network Address Translation, and can therefore make multiple connections back to the client.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

We claim:

1. A method for establishing communication with a first entity inside a network, comprising the steps of:

receiving a first address request originating from outside said network, said first address request includes a request for an address of said first entity, said first address request identifies said first entity with a domain name for said first entity;

responding to said first address request, including providing a first address that is not unique to said first entity within said network;

receiving a request for communication with said first entity, said request for communication is from a second entity; and establishing communication between said first entity and said second entity if said second entity caused said first address request.

2. A method according to claim 1, wherein:

said first address request is a DNS request.

3. A method according to claim 1, wherein:

said step of receiving a request for communication includes receiving a request for a TCP connection.

4. A method according to claim 1, wherein:

said step of receiving a request for communication includes receiving a UDP packet.

5. A method according to claim 1, wherein:

said step of establishing communication includes establishing a TCP connection.

6. A method according to claim 1, wherein:

said step of establishing communication includes relaying a UDP packet.

7. A method according to claim 1, wherein:

said step of establishing communication includes establishing a SMTP connection.

8. A method according to claim 1, wherein:

said step of establishing communication includes establishing a FTP connection.

9. A method according to claim 1, wherein:

said step of receiving a first address request includes receiving a DNS request from a DNS server;

said first address is an IP address for a gateway; and said second entity caused said first address request if said second entity requested said first entity's address from said DNS server.

10. A method according to claim 9, wherein:

said step of establishing communication includes determining whether said second entity has said DNS server as a DNS authority.

11. A method according to claim 10, wherein:

said step of determining whether said second entity has said DNS server as a DNS authority includes sending a DNS request to determine said second entity's DNS authority.

12. A method according to claim 10 wherein:

said step of receiving a request for a communication includes receiving a requesting address;

said step of determining whether said second entity has said DNS server as a DNS authority includes sending a DNS request for an "A" type record based on said requesting address, receiving a response to said DNS request for an "A" type record and sending a DNS request for a pointer type record based on said response to said DNS request for an "A" type record.

13. A method according to claim 9, wherein:

said request for communication originated from said second entity; and said step of establishing communication includes comparing said second entity's address to said DNS server's address.

14. A method according to claim 1, wherein:

said first address request is generated by a source having a source address;

said request for communication is generated by said second entity, said second entity having a second address; and said step of establishing communication includes determining whether said second address equals said source address.

15. A method according to claim 1, wherein:

said step of establishing communication includes relaying packets between said first entity and said second entity.

16. A method according to claim 1, wherein:

said step of receiving a first address request includes storing a requesting address and a forwarding address in a table.

17. A method according to claim 1, wherein:

said step of receiving a request for communication includes storing a requested port in a table.

18. A method according to claim 1, further including the steps of:

waiting for a client connection after said step of responding, said second entity resides in a remote network; and denying a DNS request from an entity that is residing in said remote network during said step of waiting.

19. A method according to claim 1, further including the steps of:

waiting for a client connection after said step of responding, said second entity resides in a remote network, said step of receiving a first address request includes receiving a first DNS request from a DNS server; and denying a second DNS request from an entity that is residing in said remote network during said step of waiting;

said step of establishing communication includes making a pointer request, receiving a pointer reply, making a authority request based on said pointer reply, receiving an authority response and making a server connection if said DNS server is on a DNS authority list of said second entity.

20. A method according to claim 1, wherein:

said step of establishing communication includes redirecting HTTP communication to an unused port.

21. A method according to claim 1, wherein:

said step of establishing communication includes responding with an HTTP redirect to an unused port number, listening for HTTP requests to said unused port number and forwarding requests for said unused port number to said first entity.

22. A physical object storing processor readable code, said processor readable code for programming a processor to perform a method comprising the steps of:

receiving a first address request originating from outside said network, said first address request includes a request for an address of said first entity, said first address request identifies said first entity with a domain name for said first entity;

responding to said first address request, including providing a first address that is not unique to said first entity within said network;

receiving a request for communication with said first entity, said request for communication is from a second entity; and establishing communication between said first entity and said second entity if said second entity is associated with said first address request.

23. A physical object according to claim 22, wherein:

said step of receiving a first address request includes receiving a DNS request from a DNS server;

said first address is an IP address for a gateway; and said second entity is associated with said first address request if said second entity requested said first entity's address from said DNS server.

24. A physical object according to claim 22, wherein:

said first address request is from a domain outside of said network; and said second entity is associated with said first address request if said second entity is in said domain.

25. A physical object according to claim 24, wherein said method further includes the steps of:

waiting for said request for communication; and denying an address request from said domain during said step of waiting.

26. A physical object according to claim 22, wherein said method further includes the steps of:

waiting for a client connection after said step of responding, said second entity resides in a remote network, said step of receiving a first address request includes receiving a first DNS request from a DNS server; and denying a second DNS request from an entity other than said second entity that is residing in said remote network;

said step of establishing communication includes making a pointer request, receiving a pointer reply, making an authority request based on said pointer reply, receiving an authority response and making a server connection if said DNS server is an authority for said second entity.

27. A physical object according to claim 22, wherein:

said step of establishing communication includes responding with an HTTP redirect to an unused port number, listening for HTTP requests to said unused port number and forwarding requests for said unused port number to said first entity.

28. An apparatus, comprising:

a server, said server being programmed to perform the method of:

receiving a first address request originating from outside said network, said first address request includes a request for an address of said first entity, said first address request identifies said first entity with a domain name for said first entity;

responding to said first address request, including providing a first address that is not unique to said first entity within said network;

receiving a request for communication with said first entity, said request for communication is from a second entity; and establishing communication between said first entity and said second entity if said second entity is associated with said first address request.

29. An apparatus according to claim 28, wherein:

said step of receiving a first address request includes receiving a DNS request from a DNS server;

said first address is an IP address for a gateway; and said second entity is associated with said first address request if said second entity requested said first entity's address from said DNS server.

30. An apparatus according to claim 29, wherein:

said first address request is from a domain outside of said network; and said second entity is associated with said first address request if said second entity is in said domain.

31. An apparatus according to claim 30, wherein said method further includes the steps of:
waiting for said request for communication; and
denying a DNS request from said domain during said step of waiting.

32. An apparatus according to claim 28, wherein said method further includes the steps of:
waiting for a client connection after said step of responding, said second entity resides in a remote network, said step of receiving a first address request includes receiving a first DNS request from a DNS server; and
denying a second DNS request from an entity other than said second entity that is residing in said remote network;
said step of establishing communication includes making a pointer request, receiving a pointer reply, making an authority request based on said pointer reply, receiving an authority response and making a server connection if said DNS server is an authority for said second entity.

33. An apparatus according to claim 28, wherein:
A said step of establishing communication includes responding with an HTTP redirect to an unused port number, listening for HTTP requests to said unused port number and forwarding requests for said unused port number to said first entity.

34. A method for establishing communication with a first entity inside a network, comprising the steps of:
receiving a request, originating from a domain outside said network, for an address of said first entity, said request for an address identifies said first entity by a domain name for said first entity;
responding to said request by providing a first address for said first entity, said first address is not unique to said first entity within said network;
receiving a request to communicate with said first entity from a second entity;
determining that said second entity is in said domain;
facilitating communication between said second entity and said first entity.

35. A method according to claim 34, further comprising the step of:
waiting for said request to communicate; and
refusing to service additional requests for said address of said first entity from said domain during said step of waiting.

36. A method according to claim 34, wherein:
said request for an address is from said second entity.

37. A method according to claim 34, wherein:
said request for an address is from a DNS server.

38. A method according to claim 34, wherein:
said step of facilitating includes acting as a packet relay.

* * * * *